United States Patent [19]
Bockris et al.

[11] Patent Number: 4,734,168
[45] Date of Patent: Mar. 29, 1988

[54] METHOD OF MAKING N-SILICON ELECTRODES

[75] Inventors: John O'M. Bockris, College Station, Tex.; Marek Szklarczyk, Piaseczno, Poland; Aliasgar Q. Contractor, College Station, Tex.

[73] Assignee: Texas A & M University, College Station, Tex.

[21] Appl. No.: 676,875

[22] Filed: Nov. 30, 1984

Related U.S. Application Data

[62] Division of Ser. No. 521,402, Aug. 8, 1983, Pat. No. 4,501,804.

[51] Int. Cl.$^4$ .......................... H01L 21/02; C25D 7/12
[52] U.S. Cl. ..................................... 437/141; 204/37.1; 204/38.3; 204/42; 204/34.5; 429/111; 437/238
[58] Field of Search .............. 429/111; 204/34.5, 37.1, 204/38.3, 38.1, 35.1, 42; 427/85, 88, 93, 123, 125

[56] References Cited

U.S. PATENT DOCUMENTS

| | | | |
|---|---|---|---|
| 3,645,860 | 2/1972 | Fishman et al. | 204/37.6 |
| 4,011,149 | 3/1977 | Nozik | 204/129 |
| 4,203,814 | 5/1980 | Grahtham | 204/129 |
| 4,310,405 | 1/1982 | Heller | 204/252 |
| 4,328,080 | 5/1982 | Harris | 204/192 EC |

OTHER PUBLICATIONS

Raymond N. Dominey et al, "Improvement of Photoelectrochemical Hydrogen Generation . . . ", J. Am. Chem. Soc., vol. 104, No. 2, 1982, pp. 467–482.
G. Hodes et al, "Heterojunction Silicon/Indium Tin Oxide Photoelectrodes . . .", J. Am. Chem. Soc., vol. 105, No. 3, 1983, pp. 324–330.
M. Szklarczyk, "Spectroscopic and Microscopic Studies of Photoelectrode Surfaces", Solar Energy Materials, vol. 11, 1984, pp. 105–121.
Metal Finishing Guidebook and Directory for 1978, Metals and Plastics Publications, Inc., Hackensack, N.J., p. 146.
Frederick A. Lowenheim, Electroplating, McGraw-Hill Book Co., New York, 1978, p. 129.
A. Heller et al, Hydrogen-Evolving Semiconductor Photocathodes . . . , J. Am. Chem. Soc., vol. 104, No. 25, 1982, pp. 6942–6948.
F. Fan et al, Semiconductor Electrodes, J. Electrochem. Soc.: Accelerated Brief Communication, Jul., 1982, pp. 1647–1649.
Y. Nakato et al, The Catalytic Effect of Electrodeposited Metals . . . , Ber. Bunsenges. Phys. Chem. 80(1976) pp. 1289–1293.
Y. Nakato et al, Photo-Electrochemical Behaviors of Semiconductor Electrodes . . . , Chemistry Letters, Chemical Society of Japan, 1975, pp. 883–886.
J. C. M. Brokken-Zijp et al, . . . Ferrous-Thionine Photogalvanic Cell, Ber. Bunsenges. Phys. Chem. 84 (1980) pp. 1034–1040.
Adam Heller et al, Efficient Solar to Chemical Conversion . . . , Physical Review Letters, The American Physical Society, vol. 46 No. 17, Apr. 27, 1981, pp. 1153–1156.

Primary Examiner—John F. Niebling
Assistant Examiner—William T. Leader
Attorney, Agent, or Firm—Vinson & Elkins

[57] ABSTRACT

The photoelectrolysis of water by solar radiation to produce hydrogen and oxygen is achieved using semiconductor electrodes. The cell comprises a p-silicon wafer treated with catalyst as photocathode and metal doped n-silicon wafer as photoanode. The cell is operated at a small bias potential.

6 Claims, 6 Drawing Figures

METHOD OF MAKING N-SILICON ELECTRODES

This application is a division of co-pending application Ser. No. 521,402 filed Aug. 8, 1983, now U.S. Pat. No. 4,501,804.

BACKGROUND OF THE INVENTION

The present invention relates to the production of hydrogen and oxygen by photo-assisted electrolysis of water using solar radiation.

It is well known that the direct decomposition of water is possible at semiconductor electrodes in a photoelectrochemical cell. In such a cell, the p-n dry junction is replaced by a p-electrolyte-n junction. Electron-hole pairs are generated by the absorption of light, such as sunlight, in both semiconductor electrodes and, after charge separation due to an energy barrier, the charge carriers take part in electrochemical reactions. At the p-type photocathode, electrons combine with $H^+$ ions or water to produce hydrogen. At the n-type photoanode, electron "holes" or "positive" charges, combine with $OH^-$ ions or water to produce oxygen. The net effect is decomposition of water in the electrolyte, with production of gaseous hydrogen at the photocathode and gaseous oxygen at the photoanode. An externally induced electrical bias in the form of an imposed voltage differential between the photoanode and photocathode accelerates the photochemical effect.

Sufficient energy is available in normal sunlight to make theoretically possible photoelectrochemical cells in which the energy value of the produced hydrogen and oxygen would substantially exceed the energy "costs" of building and operating the cells. The result would be the availability of virtually unlimited quantities of relatively low cost, non-polluting, energy.

Hydrogen is a very versatile raw material. It is, for example, a most desirable source of fuel and energy due to the clean and non-toxic nature of its combustion products. In addition, it is used, for example, in the fertilizer, metallurgical and electrochemical industries. Similarly, oxygen has wide utility as a chemical feedstock and, if produced very cheaply, or as an essentially free by-product of hydrogen production, could also be used as a high temperature combustion promoter, which would make usable as clean burning fuels a wide range of poorly combustible materials.

Efficient solar energy conversion of water to hydrogen and oxygen therefore could provide a major new, nondepletable, energy source, as well as one which would be free of the environmental pollution problems associated with hydrocarbon fuels.

The rapid increase in costs of conventional fuels, particularly hydrocarbons, in recent years, as well as increasing concern over the environmental effects of utilizing hydrocarbon fuels, has prompted increased research and development efforts in the area of improving catalysts, methods and apparatus for photoelectrolytic decomposition of water to produce pure hydrogen and oxygen. Most previous attempts at photoelectrolysis of water have utilized high band-gap semiconductors, such as titanium dioxide ($TiO_2$) with a band-gap of about 3.2 eV or gallium phosphide (GaP) with a band-gap of about 2.2 eV, as electrode materials. Although these semiconductors are relatively stable, they are able to absorb only a very small fraction of the solar energy falling on the electrodes because their high band-gaps require relatively more energy to excite or displace electrons in the materials to the point where they will be available for electrolytic reactions. As a result, these materials demonstrate only very small efficiencies for solar energy conversion. They also are relatively high cost due to their rare element components and because they do not have wide industrial applications to contribute to large scale manufacturing economies.

It has been suggested that p- and n-type silicon be utilized as the electrode materials in photoelectrochemical cells. Silicon has a relatively low band-gap of about 1:1 eV and is much lower in cost than prior art electrode materials, because of its inexpensive starting materials and because it is widely used in other industrial applications. Nevertheless, previous attempts to produce a silicon electrode photochemical cell have been disappointing. At least two separate problems have plagued researchers. First, the efficiency for hydrogen production at the cathode has been quite low, on the order of only ½ of 1% of the available light energy on the cathode being utilized for hydrogen production. When the photocathode has been plated with high cost catalytic materials, such as platinum, efficiency may be increased to about 10%, but at greatly increased manufacturing cost, due to the high price of platinum or similar catalytic materials. Secondly, use of silicon type photoanodes has been hindered by the tendency of such anodes to form an insulating silica film, which very quickly reduces the efficiency of the anode.

It is, accordingly, the primary object of the present invention to product a photochemical cell for electrolysis of water, which cell is more efficient, more stable and lower cost than cells previously known.

A further object is to provide a p-silicon type photocathode for use in photo-assisted electrolysis of water, which photocathode is both cheaper to manufacture and more efficient for hydrogen production than those previously known, together with a novel method of making the same.

A further object is to provide an improved n-silicon photoanode for use in photo-assisted electrolysis of water, which photoanode is less expensive and more stable than those previously known, together with a novel method of making the same.

These and other objects and advantages of the present invention will be best understood by reference to the following detailed disclosure and description of illustrative embodiments of the invention, taken in conjunction with the accompanying drawings in which.

DETAILED DESCRIPTION OF THE INVENTION

The Photoelectrolytic Cell

Figure 1:
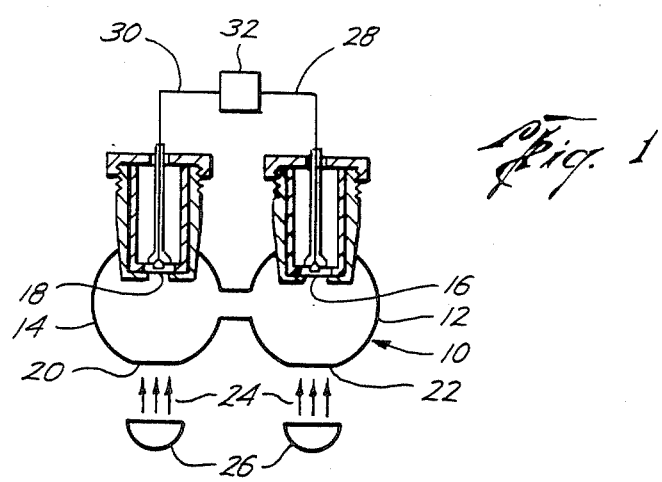
FIG. 1 is a somewhat schematic illustration of a photochemical cell utilizing the improved p-silicon cathode and n-silicon anode of the present invention.

Referring to FIG. 1, there is shown, in schematic plan view, a photochemical cell 10 including a container 12 holding an aqueous electrolyte 14. The electrolyte may be a weakly acidic, basic or neutral aqueous solution. Immersed in the electrolyte are at least one photocathode 16 and one photoanode 18, prepared in accordance with the present invention. Means are provided, such as transparent windows 20 and 22 for the admission of light 24 from sun-simulating light source 26 into the cell to illuminate the surface of the photoanode and photocathode. Electrical conductors 28 and 30 extend from the photocathode 16 and photoanode 18, respectively, to a source of electrical voltage potential 32, which may be an electric storage battery, dry photovoltaic cell, or other low voltage direct current source. In the preferred embodiment, the cell voltage supplied by source 32 to the cell 10 is in the range of approximately 1½ to 2 volts. When light is shown in the p-silicon photocathode and n-silicon photoanode at an intensity level of approximately one sun, and an electrical potential of approximately 1½ to 2 volts is supplied by means 32 to the cell, hydrogen gas is evolved at the surface of the photocathode 16 and bubbles up through the electrolyte 14 for collection by suitable hydrogen collection means (not shown). Simultaneously, oxygen gas is evolved at the surface of the photoanode 18, bubbles upwardly through electrolyte 14, and is collected by suitable oxygen collection means (not shown).

The Photocathode

At the p-type silicon semi-conductor electrode, hydrogen generation takes place during the water photosplitting process according to the reaction: $2e^- + 2H^+ \rightarrow H_2$.

The present invention involves making p-silicon an efficient photocathode for hydrogen evolution. The increase in efficiency is achieved by partial coating of the silicon surface by minute quantities of metallic catalysts as described more fully below. The preferred catalyst materials are nickel (Ni), platinum (Pt), gold (Au), silver (Ag), cobalt molybdate ($CoMoO_4$), and nickel molybdate ($NiMoO_4$).

EXAMPLE 1

A p-type single crystal silicon wafer, 1 mm thick, was polished and cleaned ultrasonically to form the body of a cathode. The silicon wafer was mounted on a backing of indium gallium alloy to provide means for making an electrical (Ohmic) contact to the silicon wafer. The wafer surface was then etched in a 48% hydrofluoric acid and aqua regia mixture and then in 48% hydrofluoric acid until a blackened surface was obtained. Following this etching, the p-Si photocathode was polarized in the cathodic potential region in 1N $H_2SO_4$ solution. Nickel catalyst was then deposited on the etched surface by galvanostatic plating. The charge was equal to 1.4 milli-coulombs per square centimeter, or sufficient to deposit about three mono-layers of nickel on the silicon wafer. (A "monolayer" is defined as the amount of the metal which would be required to cover the active surface of the silicon wafer with a layer of metal one molecule thick, if distributed uniformly.) Electron microscope examination confirmed that the nickel was deposited in "island" form (i.e., in generally discrete, disconnected particles of nickel, each particle being several molecules in thickness).

Figure 2:
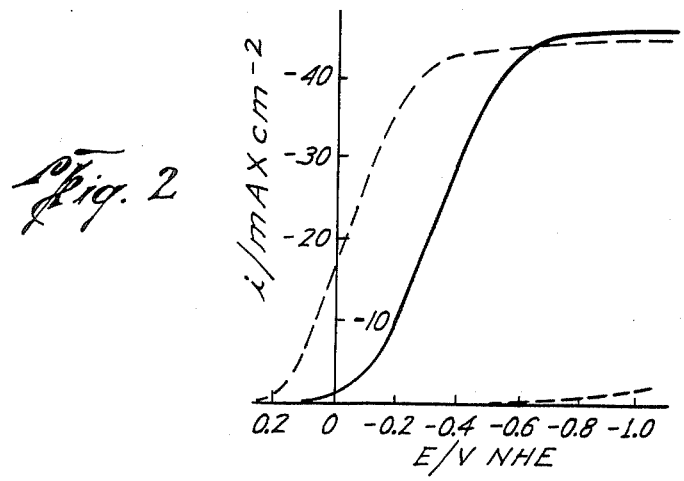
FIG. 2 is a plot of current versus voltage for a p-silicon photocathode produced in accordance with the present invention.

Using this photocathode in the cell shown in FIG. 1, with an electrolyte of 0.5 molar sulfuric acid, a metallic platinum photoanode, and an illumination equal to approximately one-sun, produced the potential versus current run shown in FIG. 2.

In FIG. 2, the vertical scale is current, measured in milli-amperes per square centimeter of the active cathode surface area and the horizontal scale is applied electrode potential in volts in the normal hydrogen scale. The dashed curve shows results for the nickel-treated p-silicon photocathode of the example, while the solid line shows corresponding results for an untreated p-silicon cathode. The dash line shows "dark" current for the cell. Calculating efficiency of the p-Si-Ni cathode for hydrogen production according to the formula:

$$E_{net} = \frac{i_{ph} \times 1.23}{I + V_{cell} \times i_{total}}$$

in which
 $E_{net}$ = net efficiency
 $i_{ph}$ = photo current in mA/cm$^2$
 $i_{total}$ = photo current and "dark" current in mA/cm$^2$
 I = incandescent light intensity in milliWatts/cm$^2$
 $V_{cell}$ = potential difference between the working and counter electrodes produces a net efficiency of 30% at about 2.0 volts.

Therefore the p-Si-Ni photocathode of the present invention not only demonstrates significantly improved efficiency for $H_2$ production as compared to the best known prior art cathode materials, but does so utilizing relatively cheap p-silicon and nickel components.

EXAMPLE 2

The procedure of Example 1 was repeated for a series of p-silicon photocathodes prepared and tested in the manner described, but with different deposited metals. The other metals tested were lead, cadmium, cobalt, gold and platinum. In each instance the metal deposited was about three monolayers and electron microscope examination was used to confirm that the metal was present on the silicon surface in island form. The metals are characteristic of large variations in the rate constant for the deposition of hydrogen on themselves. This can be varied over about eight orders of magnitude.

Figure 3:
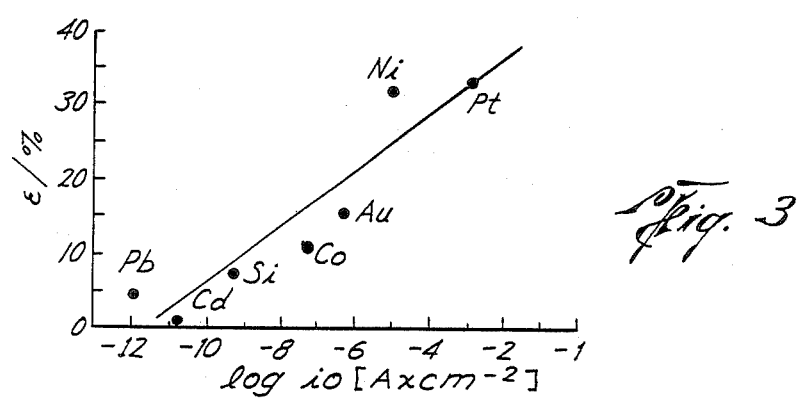
FIG. 3 is a plot of efficiency of tested p-silicon photocathodes produced in accordance with the present invention versus the log of the exchange current density for the test metal deposited on the silicon.

The results shown in FIG. 3. The efficiency of the test photocathodes for evolution of hydrogen (with efficiency calculated by the formula of Example 1) is shown to vary directly proportionately to log $i_o$, where $i_o$ is the exchange current density for the evolution of hydrogen on the massive metal.

Several conclusions seem to follow.

(1) It is likely that under these circumstances the rate determining step of the reaction is the interfacial reaction between electrons and protons at the metal-solution interface.

(2) In the circumstances concerned, the effect of the semiconductor is to act as a light collector and photoelectron producer. The reaction does not appear to occur on the semiconductor surface, but rather on the metal. This is shown by the fact that when the rate constant for the deposited metal is below that for the silicon substrate (i.e., semiconductor), the reaction mixture continues to follow the metal particles on the surface. Thus, electrons within the semiconductor must be drawn to the spot to which the metal exists and emit to protons only there. The effect of the metal islands has made the metal itself (not the properties of the semiconductor affected by the metal) the determiner of the rate.

(3) The effects noted increase the efficiency of photoelectrochemical energy conversion substantially carrying the efficiencies from around 1% to more than 40% (under potential bias around 1 V.).

The results of the present experiments introduce, a factor for which there is no analogue in photovoltaics. It is possible to avoid the trapping of the photoelectrons in the surface during their passage through the semiconductor-solution interface, and route them via catalytic metals, which then determine (for a given semiconductor) the rate of hydrogen production. The metals alone have no band gap and hence no mechanism for preserving photo-electrons till they reach the surface. In this way, the recombinative properties of surface states may be rendered innocuous, especially in the more electrocatalytic metals.

Since the efficiency of the p-silicon photocathode for hydrogen evolution is shown to depend on the exchange current density of the deposited metal, it is possible to predict the performance of p-silicon cathodes utilizing other catalytic metals and metal oxides deposited in island form as described in Example 1. On this basis, it is believed that highly efficient p-Si photocathodes would include those prepared as described in Example 1 and on which the deposited metal is selected from the group comprising nickel (Ni), platinum (Pt), gold (Au), silver (Ag), cobalt molybdate ($CoMoO_4$), and nickel molybdate ($NiMoO_4$), due to the high exchange current densities of those metals.

The Photoanode

The use of small band-gap materials as photoanodes for the photoelectrolysis of water has heterfore been prevented by the poor stability of such materials. When n-Si is used as the anode, its photoactivity rapidly diminishes due to the formation of an insulating layer of $SiO_2$ (silica). The insulating character of the $SiO_2$ results in a high electric field within the $SiO_2$ film which aids in its further growth by promoting ionic migration of silicon ions from the electrode to the surface where they combine with $OH^-$ ions to form additional $SiO_2$.

The improvement accomplished in accordance with the present invention involves making the incipient, or initially developing, film of $SiO_2$ electrically conducting. Increased conductivity of the $SiO_2$ reduces the field within the film and thus limits its further growth. The inert chemical nature of the $SiO_2$ film, once it is rendered conductive rather than insulating, is actually advantageous, since it protects the semiconductor electrodes from chemical attack. Also, there is little loss of photons from absorption in $SiO_2$ due to its high band-gap (9.0 eV) which does not tend to absorb photons.

The increased conductivity of $SiO_2$ is achieved by appropriate doping with elements such as platinum (Pt), palladium (Pd), nickel (Ni), cobalt (Co), gold (Au), rhodium (Rh), ruthenium (Ru) and tellurium (Te) by the procedure described below.

EXAMPLE 3

Single crystal silicon doped with phosphorus to a concentration $5 \times 10^{15}$ cm$^{-3}$ was obtained from the Monsanto Corporation. Ohmic contact was made using an In-Ga alloy. The active surface was prepared by etching in a mixture of 48% hydrofluoric acid and aqua regia followed by an etch in 48% hydrofluoric acid until a blackened surface was obtained. Platinum was electrodeposited on the etched surface galvanostatically from 5% $H_2PtCl_6$. The amount of deposited platinum, estimated from the cathodic charge, was varied from 0.002 monolayer to 2.5 monolayers for various test electrodes. Electron microscope examination confirmed that this platinum was not deposited as a uniform layer, but as islands. Following the platinum deposition, an $SiO_2$ layer was formed on the silicon surface (essentially completely covering the deposited platinum islands as well as the exposed Si surface) by an anodic sweep from 0.6 to 1.9 V (NHE) in 0.2M $H_2SO_4$ under simulated solar illumination equal to approximately 2.5 suns. A single sweep generally resulted in a passive surface as evidenced by reduction to a negligible photocurrent on the subsequent sweep. The thickness of the $SiO_2$ layer was estimated from the anodic charge, also taking into account the presence of a native oxide approximately 30° A thick due to exposure to $O_2$ in the air. On this basis the total oxide layer was estimated to be approximately 100° A thick.

"Doping" of the oxide layer with platinum was achieved by a brief thermal treatment at 200° C. for 5 minutes. This procedure essentially fully dispersed the platinum previously electro-deposited onto the n-silicon surface into the $SiO_2$ layer and thereby rendered the $SiO_2$ layer electrically conductive. The doping step was carried out in ampoules evacuated to $5 \times 10^{-5}$ torr.

Figure 4:
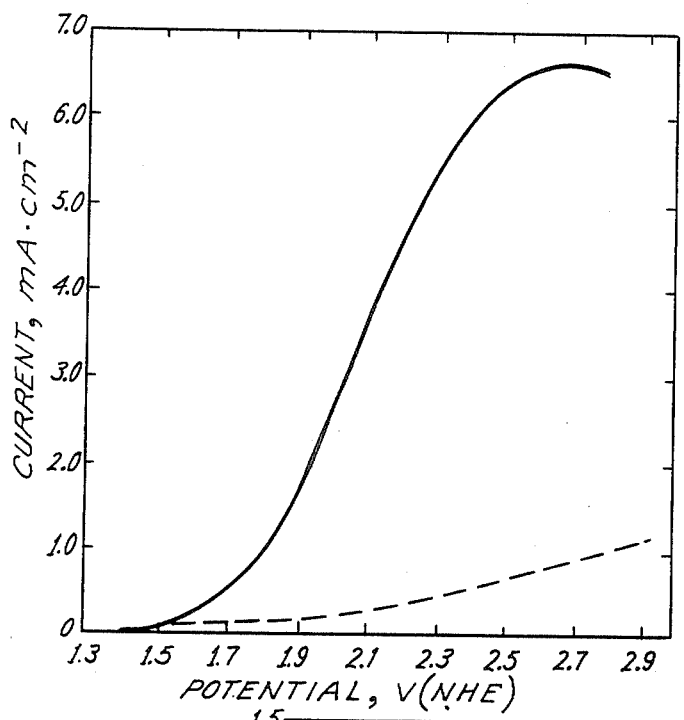
FIG. 4 is a plot of current versus voltage for an n-silicon photoanode produced in accordance with the present invention.

The doped electrodes were mounted in Teflon holders and tested for photoactivity in 0.2M $H_2SO_4$ under illumination from a solar simulator equal to approximately 2.5 suns (250 mWatts/cm$^2$). A typical current versus voltage plot is shown in FIG. 4 with the solid line representing the lighted current response and the dashed line, the dark current response. Gas evolution was visible at the electrode surface.

There was little change in activity after continuous cycling under illumination of 250 mW/cm$^2$ for 15 minutes. For an undoped p-silicon electrode, the photoactivity would have dropped off sharply after only a few seconds.

Figure 5:
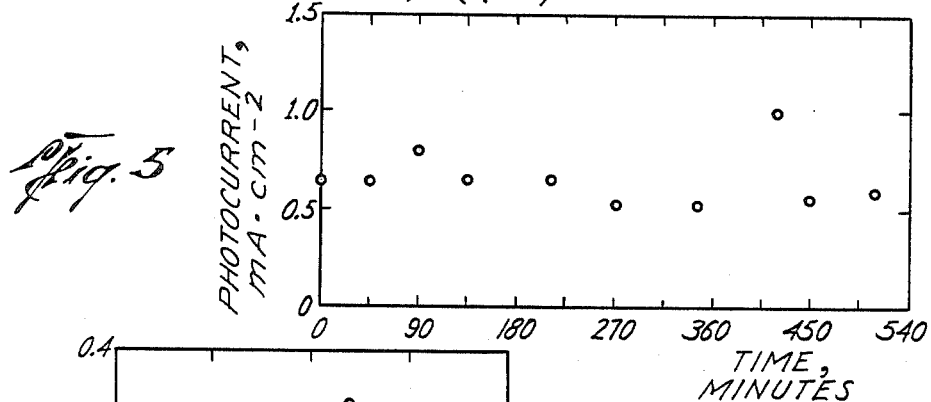
FIG. 5 is a plot of test data demonstrating photostability of the doped n-silicon photoanode produced in accordance with the present invention.

The test electrodes were stored in air overnight and tested periodically over a few days, showing little change in activity over a cumulative illumination period of more than seven hours. In FIG. 5 is shown a plot of the data demonstrating relative independence of the photocurrent produced from the period of illumination over the indicated range. The FIG. 5 data were obtained at a constant potential of approximately 2.08 V (NHE) and a one-sun solar simulator (100 mW/cm$^2$).

Figure 6:
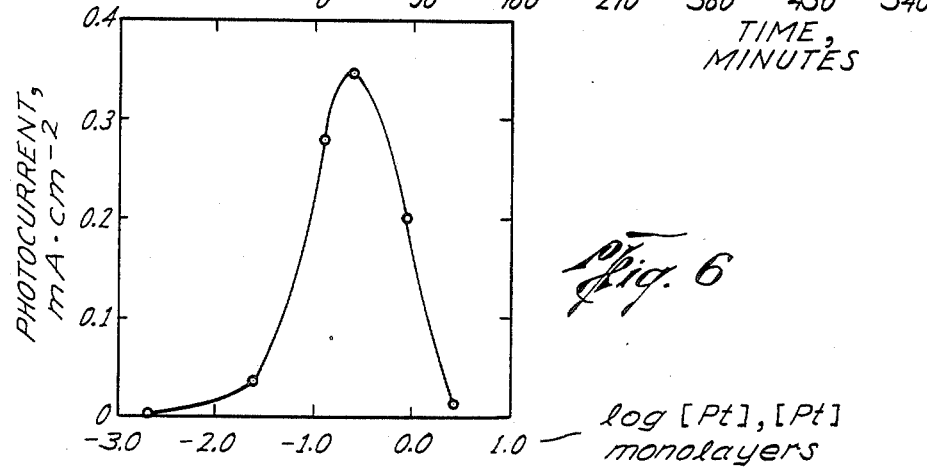
FIG. 6 is a plot of test data demonstrating variations in the photocurrent produced by a doped n-silicon photoanode in accordance with the present invention as a function of the quantity of the dopant metal.

The photocurrent generated by the test anodes was shown to vary with the amount of platinum deposited on the silicon surface prior to thermal treatment. FIG. 6 shows the dependence of photocurrent on deposited platinum concentration over the evaluated range, under a constant potential of 1.9 V (NHE) in an electrolyte of 0.1M $H_2SO_4$ and under solar simulator at 250 mW/cm$^2$. As shown, the activity of the photoanode was maximum for electrodes on which an approximately 0.25 monolayer of platinum had been deposited.

In addition to platinum, it is anticipated that other elements with approximately the same electron work function as platinum (approximately 5.0 eV), such as Pd, Ni, Co, Au, Ir, Rh, Ru, and Te may also be used in the manner described to render the incipient $SiO_2$ layer electrically conductive.

EXAMPLE 4

A p-Si-Ni photocathode prepared as described in Example 1 and an n-Si-Pt photoanode, prepared as described in Example 3 were combined in a two component cell such as shown in FIG. 1. The electrolyte was 0.5M $H_2SO_4$ and simulated solar illumination was approximately equal to one sun. The observed photocurrent was proportional to the applied voltage. Maximum photocurrent measured was 30 milliamperes per square centimeter. Hydrogen gas evolution was observed at the photocathode and oxygen gas evolutions was observed at the photoanode.

It is therefore seen that, in accordance with the present invention, an extremely high efficiency and low cost p-Si photocathode is provided, together with a low cost, stable n-Si photoanode. The two may be combined to provide a low cost photochemical cell for production of $H_2$ and $O_2$ which produces the highest reported efficiency for solar energy conversion by direct photo-assisted electrolysis of water.

The foregoing disclosure and description of the invention is illustrative and explanatory thereof and various changes in the size, shape, materials and details of construction and operation may be made within the scope of the appended claims, without departing from the scope of the invention.

What is claimed is:

1. The method of preparing an improved photoanode comprising;
   depositing a dopant agent selected from the group consisting of platinum, palladium, nickel, cobalt, gold, rhodium, ruthenium and tellurium in island form onto at least one surface of an n-silicon body;
   forming a layer of silicon dioxide on said one surface of said body; and
   dispersing the dopant into said silicon dioxide layer to thereby render the layer electrically conductive.

2. The method according to claim 1 wherein an amount of from about 0.002 to about 2.5 monolayers of said dopant are deposited in island form on said surface of said n-silicon body.

3. The method according to claim 1 wherein said silicon dioxide layer is formed utilizing an anodic sweep of from about 0.6 to about 1.9 volts (NHE) in 0.2 molar $H_2SO_4$ under simulated solar illumination equal to about 2.5 suns.

4. The method according to claim 1 wherein said dopant deposited in island form is dispersed into said silicon dioxide layer by heating said n-silicon body with said dopant and $SiO_2$ layer deposited thereon at approximately 200° C. for approximately 5 minutes at a vacuum of about $5 \times 10^{-5}$ torr.

5. The method of preparing an improved photoanode comprising:
   depositing platinum in island form onto at least one surface of an n-silicon body;
   forming a layer of silicon dioxide on said surface of said n-silicon body; and
   dispersing said platinum into said silicon dioxide layer to thereby render said silicon dioxide layer electrically conductive.

6. The method according to claim 5 wherein an amount of approximately 0.25 monolayers of said platinum is deposited in island form onto said surface of said n-silicon body.

* * * * *